3,227,703
PROCESS FOR DEODORIZING THERMALLY DEGRADED, UNOXIDIZED POLYOLEFINS

Preston S. Copenhaver, Jr., Marion, Va., and Raymond L. Etter, Jr., Longview, Tex., assignors to Eastman Kodak Company, Rochester, N.Y., a corporation of New Jersey
No Drawing. Filed Jan. 28, 1963, Ser. No. 254,461
9 Claims. (Cl. 260—94.9)

This invention relates to an improved process for removing odoriferous materials from thermally degraded polyolefins, and more particularly the removal of such objectionable odors from thermally degraded, essentially unoxidized, relatively low molecular weight polyethylenes, and the like polyolefins.

This application is a continuation-in-part of our copending application, Serial No. 109,806, now U.S. Patent 3,169,950, filed May 15, 1961.

It is well known that relatively low molecular weight polyolefins have many commercial applications, and are especially useful for blending with natural and synthetic waxes to improve the physical properties thereof. The preparation of such low molecular weight polyolefins by direct polymerization of the monomeric olefins has not proven practical for various reasons for commercial production. However, they can be readily produced by degrading higher molecular weight polyolefins to these desirable lower molecular weight products under non-oxidizing conditions. The degradation is initiated by heat and the degradation of the polymer usually takes place at points of chain branching in the carbon chain. The degree of thermal degradation is controlled by reaction time and temperature in order to produce a degraded polymer having the desired properties. These degraded products, as produced, contain substantial amounts of very low molecular weight fractions of odoriferous materials of indeterminate structures originating for the most part as by-products of the degradation process. They have been found to be very difficult to remove completely. For example, the ordinary washing technique involving the use of water or organic solvents, with or without added agents such as alkalies and acidic materials, followed by conventional means of drying for the removal of liquids from solids have not proven entirely effective. Also, conventional distillation or absorption process involve a considerable investment in capital equipment. In fact, the step of distillation, even at vacuum conditions, requires heating the polyolefin to a temperature that, in the case of heat sensitive materials, often results in partial decomposition and an actual increase in objectionable odor. As to the absorption processes, the melt viscosity of the low viscosity polyolefins is in some instances too high for effective treatment with absorbents, and besides an absorption process results in the burden of product filtration to remove suspended absorbents plus the periodic regeneration or replacement of the absorbent bed. Another expedient, practiced throughout the industry, involves the masking of the odors by the addition of agents of less objectionable odor. Actually, these masking agents serve merely to supplant the objectionable odor with one considered less objectionable and thus do not truly render the so treated polyolefin odorless. This inability to produce odor-free products and other mentioned shortcomings of the prior art processes have seriously limited their applications, especially for food packaging where essentially odor-free materials are required.

We have now discovered a new process for removing odoriferous materials from degraded, unoxidized polyolefins which is both simple and effective, and without any of the serious drawbacks inherent in the prior art processes. It involves the actual physical removal of objectionable odor bodies to a level where the odor is no longer detectable by odor testing methods. The process is particularly adaptable for the production of odor-free degraded, unoxidized polyethylenes. The products after treatment by the process of the invention are of sufficient purity to permit natural and synthetic wax formulations, for example, in paraffin formulations to coat food containers. The resistance of dairy carton waxes to thermal shock cracking is markedly improved, for example, by blending the treated polyolefins with the paraffin coating compositions. A rich, glossy, flexible, scuff-resistant, odor-free finish is obtained for paper cartons from such improved compositions.

It is an object of the invention, therefore, to provide essentially odor-free, degraded, unoxidized polyolefins. Another object is to provide essentially odor-free, degraded, unoxidized polyethylenes. Another object is to provide coating compositions containing the above treated products that have utility in paper coating applications such as food containers or cartons. Another object is to provide a simple and highly effective method for removing odoriferous materials from degraded, unoxidized polyolefins, and in particular from degraded, unoxidized polyethylenes. Other objects will become apparent from the description and examples.

In accordance with the invention, we prepare essentially odor-free-degraded, unoxidized polyolefins by contacting the degraded unoxidized polyolefin in substantially dry, discrete form, for example, as pellets or granules, with a moving stream of normally gaseous and inert material such as, for example, air, at a temperature of at least 50° C., but below the melting point of the polyolefin, for a period of time sufficient to remove a substantial amount, or even essentially all, of the odoriferous materials from the polyolefin. At this stage, no detectable odor is observed in the treated products. For especially heat sensitive materials a low enough operating temperature may be chosen so as to exclude any adverse thermal effect. The preferred gaseous material is air. However, for polyolefins readily susceptible to oxidation an inert gas may be substituted for air. Since there is no product contamination occurring during the process, there is no need for subsequent clean up treatment. Thus, on termination of the treatment, the product can be transferred to the final shipping containers with no further treatment necessary.

The process of the invention can be carried out conveniently, by charging the polyolefin pellets or granules to a suitable vessel or column which allows the polymer to be contacted with the stream of heated gas. This vessel may be almost any shape and dimension as long as good contacting of the polymer by the gas stream is achieved. However, a cylindrical vessel or column is preferred. The time of treatment can vary over a wide range from a few minutes to several days depending upon the amount of polymer to be deodorized, by the temperature employed and the shape of the vessel. The gas flow rate is also adjusted to suit the needs of the vessel, but is usually between 5–200 s.c.f. per pound of pellets or granules per cycle. In any case, the treatment with heated gas is maintained until the product is essentially odor-free. Permissible variations that can be used in the process of the invention include:

(1) The use of various gases such as air, nitrogen, carbon dioxide, helium or other inert gases.

(2) Pellet or granule size may be varied over a wide range, for example, any discrete particle of the polyolefin to be treated can be used, but preferably pellets of from about 1/16 to 1/8 inch diameter.

(3) The gas pressure and flow may be varied over a wide range. For example, pressures at normal or above or below atmospheric can be used as desired.

(4) The temperature may be any temperature below the softening or melting point of the polymer, but preferably at least 50° C.

(5) The equipment may be so designed to obtain continuous deodorization process rather than batch operation. For example, an effective method is to advance the pellets or granules by a belt carrier or screw through a suitable vessel with the heated gas following counter-current thereto.

The degraded, unoxidized polyolefins that can be effectively treated by the above described process of the invention are of relatively low molecular weight. They are prepared by thermally degrading a higher molecular weight polyolefin to the desired lower molecular weight under non-oxidizing conditions. They are non-emulsifiable in character. The degradation is initiated by heat and the degradation usually takes place at points of chain branching in the carbon chain. The degree of thermal degradation is controlled by reaction time and temperature in order to produce a degraded polymer having the desired properties. The starting polyolefin may have a molecular weight of from 10,000 to 30,000, or even higher, while the degraded polyolefin usually ranges from about 500 to 10,000 in molecular weight. By way of example, a polyethylene having an initial molecular weight of from 10,000 to 30,000 and higher can be degraded to form a polymer of substantially lower molecular weight, for example, a molecular weight within the range of from 500 to 8,000 and higher. These polymers have a softening point ranging about from 51–130° C. It will be understood, of course, that degraded ethylene polymers having molecular weights outside the ranges indicated can also be employed. The process of the invention is particularly efficacious for rendering such degraded, unoxidized polyethylenes odor-free, and the process in connection thereto is preferred.

The following examples will serve further to illustrate the advantageous process of the invention.

Example 1

A glass cylinder, 2 inches in diameter and two feet tall, was adapted to allow a gas to be introduced into the bottom and out the top, and the entire apparatus was immersed in a water bath maintained at from 70 to 80° C. The tube was charged with granules of odor-containing, degraded, unoxidized polyethylene of molecular weight of approximately 2500 and a softening point of about 111° C., and air passed through the polymer for a period of 4 hours. Samples of the starting material and the treated polymer were submitted to an odor panel (consisting of 12 persons) under notebook numbers. The results were as follows.

| Sample: | Odor-rating |
|---|---|
| Blank (feed material) | 90 |
| Treated polymer | 100 |

The ratings given above are an average of the panel testings with the following rating guide:

100—little or no detectable odor
90—some odor
80—considerable odor
70—considerable odor, decidedly unpleasant
60—strong odor, very unpleasant.

Properties determined on both the blank and treated polymers were found to be identical. No acid number was found in either case indicating no significant oxidation had occurred. However, the treated polymer was sufficiently odor-free for use in paraffin coating compositions for food containers.

Example 2

Example 1 was repeated using nitrogen as the gas stream instead of air. The results obtained were identical.

| Sample: | Odor-rating |
|---|---|
| Blank (feed material) | 90 |
| Treated polymer | 100 |

The properties and utility of the treated polymer were the same as given in Example 1.

Example 3

A stainless steel vessel approximately 3 feet high was filled with pellets about ⅛ inch diameter of the same starting odoriferous, degraded, unoxidized polyethylene as specified in Example 1. Air at about 5 p.s.i. and 100° C. was blown down through the pellet bed and vented to the atmosphere at the bottom of the tower. The pellet bed was supported at the bottom with a 50-mesh screen to contain the pellets in the bed. The air was passed through at about 250 c.f.m. with a contact time of about 12 hours. The deodorization cycle was terminated by shutting down the air blower and drawing off the deodorized pellets. An odor panel as described in Example 1 gave the following comparison.

| Sample: | Odor-rating |
|---|---|
| Blank (initial pellets) | 85 |
| Treated pellets | 100 |

The treated polymeric pellets upon analysis showed no change in physical properties from the starting material. The treated pellets on blending with paraffin wax and coating on dairy and folding cartons gave a rich, glossy, flexible, scuff-resistant and essentially odor-free finish thereto.

In place of the degraded, unoxidized polyethylene, there can be substituted in the above examples a like amount of other of the mentioned suitable starting polymeric materials to give generally similar, essentially odor-free products. For example, a degraded, unoxidized polyethylene about 1000 molecular weight, or 1500, or 3000, or higher, having softening or melting points in the specified range of from 51–130° C. can be substituted in the examples. The treated products all rate 100 by the panel testing so that they are useful over a wide range of commercial applications including food packaging.

While the invention has been illustrated with the preferred adaptation to rendering degraded, unoxidized polyethylenes of relatively low molecular weights, the process of the invention as previously indicated is also useful, in general, for the removal of odoriferous materials from degraded, unoxidized polyolefins having physical properties generally similar to those of the specifically mentioned degraded, unoxidized polyethylenes. Actually, the process of the invention has utility in the removal of odor bodies from any low molecular weight polyolefin when these odor bodies have sufficient vapor pressure to allow their removal at temperature below the softening point of the polymer by a moving air or gas stream. For example, some degree of odor removal is obtained when treating the slightly oxidized analogs of these polyethylenes. The process is also efficacious in removing odoriferous materials from low molecular weight, degraded polyolefins.

The invention has been described in detail with particular reference to preferred embodiments thereof, but it will be understood that variations and modifications can be effected within the spirit and scope of the invention as described hereinabove and as defined in the appended claims.

What we claim is:
1. A process for producing a thermally degraded polyolefin substantially free of odoriferous materials which comprises contacting a thermally degraded unoxidized polyolefin containing a substantial amount of odoriferous material in a substantially discrete form with an inert gas stream at a temperature of at least 50° C. and below the softening point of said polyolefin for a period of time sufficient to remove substantially all of said odoriferous material from said polyolefin.

2. A process for producing a thermally degraded polyethylene substantially free of odoriferous material which comprises passing a stream of air through a thermally degraded unoxidized polyethylene containing a substantial amount of odoriferous material in a substantially discrete form at a temperature within the range of 50 to 125° C. and below the softening point of said degraded polyethylene for a period of time sufficient to remove substantially all of said odoriferous material from said degraded polyethylene.

3. The process of claim 1 wherein the said stream of gaseous material is air.

4. The process of claim 1 wherein the said stream of gaseous material is nitrogen.

5. The process of claim 1 wherein the said polyolefin and the said stream of gaseous material are introduced continuously into the system.

6. The process of claim 2 wherein the said polyethylene has a molecular weight of from 500–8000 and a softening point of from 51–130° C.

7. The process of claim 2 wherein the said polyethylene is in the form of granules.

8. The process of claim 2 wherein the said polyethylene and the said stream of air are introduced continuously into the system.

9. The process of claim 2 wherein the said polyethylene has a molecular weight of approximately 1500 and a softening point of approximately 111° C.

References Cited by the Examiner
UNITED STATES PATENTS

| | | | |
|---|---|---|---|
| 2,835,659 | 5/1958 | Guillet | 260—94.9 |
| 2,928,816 | 3/1960 | Chapman et al. | 260—94.9 |
| 3,083,193 | 3/1963 | Kolner | 260—94.9 |

JAMES A. SEIDLECK, *Examiner.*

JOSEPH L. SCHOFER, *Primary Examiner.*